Patented Dec. 9, 1941

2,265,908

UNITED STATES PATENT OFFICE 2,265,908

MANUFACTURE OF SENSITIZING DYESTUFFS

John David Kendall, Ilford, England, assignor to Ilford Limited, Ilford, Essex, England, a British company No Drawing. Application October 3, 1939, Serial No. 297,769. In Great Britain October 6, 1938

13 Claims. (Cl. 260—240)

This invention relates to improvements in or relating to the sensitizing of photographic emulsions and has particular reference to the preparation and use of unsymmetrical dyestuffs suitable for this purpose.

It is an object of this invention to provide a new method of manufacture of unsymmetrical dyestuffs. A further object of the invention is to provide light-sensitive silver halide emulsions sensitized by means of the said dyestuffs.

It is known that dyestuffs capable of sensitizing photographic emulsions may be produced by reacting quaternary salts of heterocyclic nitrogen compounds which contain a reactive methyl group in the α or γ position to the nitrogen atom with ethyl-ortho-formate. The reaction takes place with the elimination of three molecules of ethyl alcohol and one molecule of the acid corresponding to the initial quaternary salt, two molecules of the heterocyclic compound becoming linked together by a conjugate chain of three carbon atoms to form a carbocyanine dye. The dyestuffs produced by such a process are invariably symmetrical.

It has now been discovered that, provided a strongly basic substance is present during the reaction, unsymmetrical dyes having sensitizing properties may be produced by the use of ortho esters of mono-carboxylic acids, by reacting together:

(a) A heterocyclic nitrogen compound containing an external reactive methyl, methylene, mono-substituted methyl or mono-substituted methylene group in the α or γ position to the nitrogen atom.

(b) An ortho ester of a mono-carboxylic acid, and (c) A heterocyclic nitrogen keto-methylene compound containing in the ring the grouping –NR₁–CO–CH₂– where R₁ is hydrogen or an alkyl, aryl or aralkyl group.

The present invention accordingly comprises a process for the preparation of an unsymmetrical dye having sensitizing properties for photographic emulsions which process consists in reacting together in the presence of a strongly basic substance a heterocyclic nitrogen compound containing an external reactive methyl, methylene, mono-substituted methyl or mono-substituted methylene group in the α or γ position to the nitrogen atom, an ortho ester of a mono-carboxylic acid and a heterocyclic nitrogen keto methylene compound containing in the ring the grouping NR₁–CO–CH₂–, where R₁ is hydrogen or an alkyl, aryl or aralkyl group.

By the expression "strong" base is meant a basic substance having basic properties as strong as or stronger than ammonia. The strongly basic substance may consist of an organic base such as piperidine, diethylamine or triethylamine. However, other strongly basic substances may be employed, e. g. caustic soda and sodium ethoxide.

The fact that unsymmetrical dyestuffs can be prepared by this process is very unexpected. As indicated above heterocyclic nitrogen compounds containing a reactive methyl group in the α or γ position to the nitrogen atom react with ethyl orthoformate to form symmetrical dyestuffs containing the residues of two molecules of the heterocyclic nitrogen compounds. Heterocyclic nitrogen keto-methylene compounds containing the grouping –NR₁–CO–CH₂– in the ring of the type of rhodanic acid will not react with ethyl ortho formate to form symmetrical dyestuffs though others in this class, e. g. pyrazolenes, will do so.

It would have been expected, therefore, that the result of heating together a heterocyclic nitrogen compound containing an external reactive methyl group, a heterocyclic nitrogen keto-methylene compound containing the grouping –NR₁–CO–CH₂– in the ring and ethylorthoformate would be to produce either the symmetrical carbocyanine dyestuff from the first of these compounds alone (if the second compound were of the rhodanic acid type) or a mixture of two symmetrical dyestuffs (if the second compound were of the pyrazolene type). In actual fact, however, by the new process using strongly basic substances, the unsymmetrical dyestuffs are almost exclusively produced, in most cases, in excellent yield, and the initial products obtained are always at most only very slightly contaminated with symmetrical dyestuffs formed as by-products.

The heterocyclic nitrogen compound containing the reactive methyl, methylene or mono-substituted methyl or methylene group in the α or γ position to the nitrogen atom is preferably a quaternary salt and in this case the course of the reaction may be represented as follows:

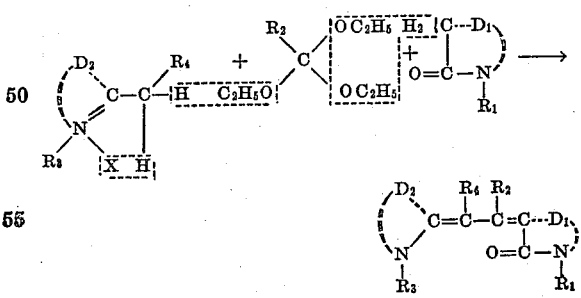

where $R_1$, $R_2$ and $R_4$ are hydrogen or alkyl, aryl or aralkyl group, $R_3$ is an alkyl, aryl or aralkyl group, X is an acid residue, $D_1$ is the residue of a heterocyclic nitrogen keto-methylene compound, e. g. the residue of a pyrazolone, pyrimidine, rhodanine, hydantoin or oxindole nucleus, and $D_2$ is the remainder of an azole or diazole nucleus.

Alternatively there may be employed instead of the quaternary salt the base corresponding to such quaternary salt, e. g. 2-methylene-1.3.3-trimethyl indoline and the course of the reaction may in this case be represented as follows, the symbols $R_1$, $R_2$, $R_3$, $R_4$, $D_1$ and $D_2$ having the same meaning as before:

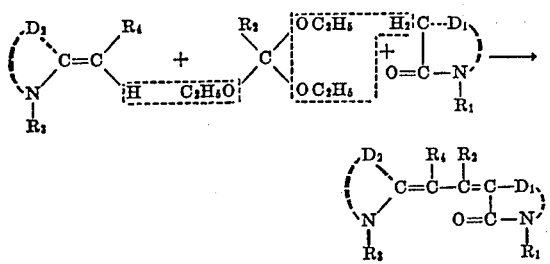

The groups $R_1$, $R_2$, $R_3$ and $R_4$ may, as stated above, be alkyl groups, e. g. ethyl, methyl, propyl, isopropyl, butyl and other alkyl groups. Preferably, where the groups $R_1$, $R_2$, $R_3$ and $R_4$ are alkyl groups, such alkyl groups contain up to 4 carbon atoms. Alternatively, the groups $R_1$, $R_2$, $R_3$ and $R_4$ may be aryl groups, e. g. phenyl or naphthyl or substituted phenyl or naphthyl groups, or aralkyl groups, e. g. benzyl and homologous groups.

The heterocyclic nitrogn compounds which may be employed in carrying out the present invention include, for example, quaternary salts of heterocyclic compounds containing a 5-membered or 6-membered ring containing nitrogen and having a substituent methyl or mono-substituted methyl group in the $\alpha$ or $\gamma$ position to the nitrogen atom. The compounds may be derivatives of thiazoles, oxazoles, selenazoles, tellurazoles, thiazolines, oxazolines, selenazolines, pyridines, quinolines, indolenines and diazines or diazoles, e. g. pyrimidine, thiodiazoles and quinazolines and of the corresponding polycyclic compounds such as benzthiazoles, naphthathiazoles and anthrathiazoles. Such heterocyclic compounds may contain substituent groups, such as alkyl groups, e. g. ethyl, methyl, propyl and isopropyl groups, aralkyl groups, e. g. benzyl, tolyl, chlorbenzyl and methylnaphthyl groups, or aryl groups, e. g. phenyl, chlorphenyl and naphthyl groups, amino or substituted amino groups, hydroxy, alkoxy, e. g. methoxy, ethoxy and butoxy groups, or aryloxy groups, e. g. phenoxy, methylphenoxy and naphthoxy groups, nitro groups or halogen atoms, e. g. chlorine and bromine atoms. The quaternary salts may be formed with various acid residues. Thus they may be formed from alkyl halides, e. g. ethyl chloride, methyl bromide and ethyliodide, alkyl-p-toluene, sulphonates, e. g. methyl and ethyl-p-toluene sulphonates and alkyl sulphates and alkyl nitrates, e. g. methyl, ethyl and isopropyl sulphates and nitrates.

Examples of heterocyclic nitrogen keto-methylene compounds which contain the group —$NR_1$—CO—$CH_2$— and which may be used in the present invention are the rhodanines, e. g. rhodanine itself, 3-alkyl rhodanines, e. g. 3-methyl rhodanine and 3-ethyl rhodanine, 3-aryl rhodanines, e. g. 3-phenyl rhodanine, 3-naphthyl rhodanine and the corresponding compounds substituted in the phenyl and naphthyl nuclei, 3-aralkyl rhodanines, e. g. 3-benzyl rhodanine, triketotetrahydro pyrimidines, e. g. barbituric acid, pyrazolones, e. g. 1-phenyl 3-methyl-5-pyrazolone, 1:3-diphenyl-5-pyrazolone, 1-phenyl 5-pyrazolone, 3-methyl-5-pyrazolone, 1-phenyl 3-furyl-5-pyrazolone and 1-naphthyl-3-furyl-5-pyrazolone, true hydantoins, e. g. hydantoin itself and N-methyl hydantoin, true thio hydantoins, e. g. thiohydantoin itself, N-methylthiohydantoin and N-allylthiohydantoin, pseudo thio hydantoins, e. g. 2-alkylimino-4-keto-tetrahydrothiazole 2-allylimino-3-ethyl-4-keto tetrahydrothiazole, 2-methylimino-3-methyl-4-keto tetrahydrothiazole and 2-phenylimino-3-phenyl-4-keto-tetrahydrothiazole and oxindoles, e. g. N-ethyl oxindole and N-methyl oxindole.

Although various ortho esters of mono-carboxylic acids may be employed it is preferable to employ the lower alkyl ortho esters of saturated mono carboxylic aliphatic acids, e. g. the ethyl, methyl, propyl, or butyl esters of orthoformic acid, ortho-acetic acid, ortho-propionic acid or ortho-butyric acid. However, esters of other ortho acids may be employed, e. g. the esters of ortho-benzoic acid or ortho-phenylacetic acid.

The reaction is preferably carried out in solution in a solvent such as ethyl alcohol and may readily be effected by refluxing the reactants together. Other solvents may be employed, e. g. pyridine, but are usually less advantageous owing to their cost.

In general the new dyestuffs crystallise out from the reaction mixture on cooling and may readily be purified by the usual methods.

Following is a description by way of example of the preparation of several dyestuffs in accordance with the process of the present invention:

EXAMPLE I

*1:3:3-trimethyl indolenine-2:4' - ethylidene 1' - phenyl-3'-methyl-5'-pyrazolone*

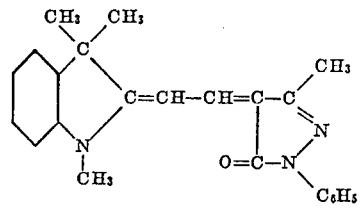

3.01 grams of 2.3.3-trimethylindolenine methiodide and 25 ccs. of dry ethyl alcohol were warmed on a water bath. To the warm solution there was added 1.3 ccs. of diethylamine and the mixture was warmed until all the solid had dissolved. There was then added to the mixture 1.74 gms. of 1-phenyl-3-methyl-5-pyrazolone and 6 ccs. of ethyl-ortho-formate. The mixture was gently refluxed for four hours when an orange colour developed and deepened to an orange-red colour. The mixture was cooled, whereupon the dyestuff formed crystallised out.

The crystalline precipitate was filtered off, and washed with ethyl alcohol. By diluting the filtrate with water a further yield of dye was obtained. The product has a melting point of 212° C.

The dyestuff is a sensitizer for photographic silver halide emulsions and extends the sensitivity of silver bromide emulsion to about 5600 A. with a maximum at 5350 A.

Example II

The dye described in Example I was prepared by substituting for the 1.8 ccs. of diethylamine one of the following alternative basic substances:

2 ccs. of piperidine.
2.2 ccs. of dry ethylamine.
A solution of 0.23 gms. of sodium in 10 ccs. of ethyl alcohol.
A solution of 0.93 gms. of potassium hydroxide in 4 ccs. of ethyl alcohol, the other reactants and conditions remaining unchanged.

Example III

*3-methyl-dihydrobenzthiazolylidene-2:4' - ethyl-idene 1'-phenyl-3'-methyl-5'-pyrazolone*

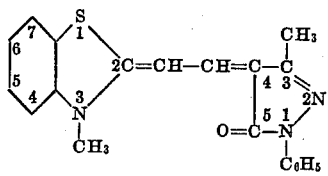

1.49 gms. of 2-methylbenzthiazole and 1.86 gms. of methyl-p-toluene sulphonate were mixed and heated together in an oil bath for three hours at 140° C. The mixture was then cooled and the solid dissolved in 25 ccs. of dry ethyl alcohol. There was then added a mixture of 1.6 ccs. of diethylamine, 1.74 gms. of 1-phenyl-3-methyl-5-pyrazolone and 6 ccs. of ethyl-ortho-formate. The resulting mixture was refluxed for one hour and a scarlet dye was precipitated from the hot solution. The mixture was further heated for two hours on a water bath and then cooled. The solid precipitate was filtered off and washed with alcohol and ether. It had a melting point of 257° C.

The dyestuff is a sensitizer for photographic silver halide emulsions and extends the sensitivity of silver bromide emulsions to about 5900 A.

Example IV

*3-methyl-dihydrobenzthiazolylidene-2:5' - ethyl-idene-3'-methyl rhodanine*

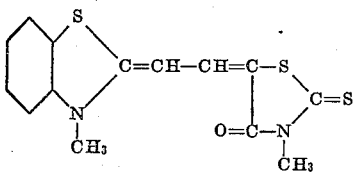

1.49 gms. of 2-methylbenzthiazole and 1.86 gms. of methyl-p-toluene sulphonate were mixed together and heated for three hours at 130–140° C. in an oil bath. The mixture was cooled and dissolved in 30 ccs. of hot alcohol. There was then added 2 ccs. of diethylamine, 1.5 gms. of N-methyl-rhodanic acid and 6 ccs. of ethyl-ortho-formate. The mixture was gently refluxed for half an hour when the dyestuff was precipitated from solution. The mixture was heated for a further three-and-a-half hours on a water bath and then cooled. The dark purple dye formed was filtered off and washed with alcohol and ether. The produce had a melting point at 288° C.

Example V

*3-methyl-dihydrobenzthiazolylidene-2:4'-isopropylidene-1'-phenyl-3'-methyl-5'-pyrazolone*

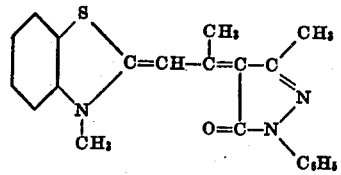

1.49 grams of 2-methylbenzthiazole and 1.86 grams of methyl-p-toluene sulphonate were mixed and heated for one-and-a-half hours at 140° C. in an oil bath. The mixture was then cooled and dissolved in 25 ccs. of hot alcohol. There was then added 2 ccs. of diethylamine, 1.74 grams of 1-phenyl-3-methyl-5-pyrazolone and 3.7 ccs. of ethyl-ortho-acetate. The mixture was gently refluxed for twenty minutes when an orange dye was precipitated. The mixture was further heated for one-and-three-quarter hours on a water bath and then cooled. The precipitated dyestuff was filtered off and washed with alcohol and ether. It had a melting point of 261° C.

The dyestuff is a sensitizer for photographic silver halide emulsions and extends the sensitivity of silver bromide emulsions to about 5800 A.

Example VI

*α - (3 - methyl-dihydrobenzthiazolylidene)-2:4'-isobutylidene-1'-phenyl-3'-methyl-5'-pyrazolone*

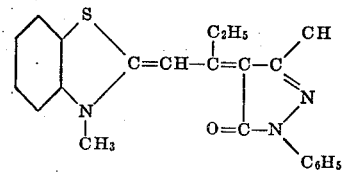

1.49 grams of 2-methylbenzthiazole and 1.86 grams of methyl-p-toluene sulphonate were mixed and heated for three hours in an oil bath at 140° C. The mixture was then cooled, and warmed with 25 ccs. of alcohol to dissolve the solid matter. There was then added 2 ccs. of diethylamine, 1.74 grams of 1-phenyl-3-methyl-5-pyrazolone and 4 ccs. of ethyl-ortho-propionate. The mixture was refluxed for two hours and after only half-an-hour of the refluxing the dyestuff began to precipitate from solution. The refluxed mixture was cooled, and the precipitated dyestuff removed by filtration. The precipitate was washed with alcohol and ether. It had a melting point of 254° C.

The dyestuff is a sensitizer for photographic silver halide emulsions and extends the sensitivity of silver bromide emulsions to about 6000 Å. with a maximum at 5500 Å.

Example VII

*1-methyl-dihydroquinolylidene - 2:4'-ethylidene-1'-phenyl-3'-methyl-5'-pyrazolone*

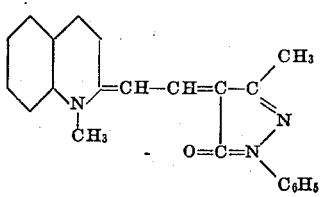

2.85 grams of quinaldine methiodide were mixed with 25 ccs. of alcohol and the mixture warmed on a water bath. There was then added 1.74 grams of 1-phenyl-3-methyl-5-pyrazolone and 6 ccs. of ethyl-ortho-formate. The mixture was heated to boiling, whereupon nearly all the solid went into solution. There was then added 2 ccs. of diethylamine whereupon a red colour was immediately developed. The mixture was boiled under reflux for four hours and cooled.

A proportion of a nearly colourless solid insoluble in alcohol was filtered off. The filtrate was diluted and, after standing, a dark red oily solid was formed which was filtered off and washed with alcohol and ether. This dark red oily solid was recrystallized from 20 ccs. of 60% aqueous methyl alcohol as dark red crystals. It was again recrystallized from 20 ccs. of 60% aqueous methyl alcohol using a little animal charcoal, when orange-red crystals were obtained, with a melting point of 130° C., at which temperature the dyestuff decomposed.

EXAMPLE VIII

*3 - ethyl - dihydrobenzthiazolylidene -2:4'-ethylidene-1'-phenyl-3'-methyl-5'-pyrozolone*

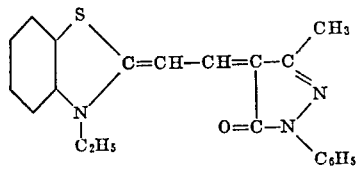

1.49 gms. of 2-methylbenzthiazole and 2 gms. of ethyl-p-toluene sulphonate were mixed and heated together for four hours at 140° C. The mixture was cooled and dissolved in 25 ccs. of hot ethyl alcohol. There was then added a mixture of 1.6 ccs. of diethylamine, 1.74 gms. of 1-phenyl-3-methyl-5-pyrazolone and 6 ccs. of ethyl-ortho-formate. The resulting mixture was gently refluxed for four hours. On cooling the dyestuff crystallized out, was filtered off and washed with ethyl alcohol and ether. The product consisted of small crimson crystals with a gold reflex having a melting point of 212° C.

The dyestuff is a sensitizer for photographic silver halide emulsions and extends the sensitivity of silver bromide emulsions to about 6000 Å. with a maximum of 5300 Å.

EXAMPLE IX

*3-methyl-dihydrobenzoxazolylidene - 2:4'-ethylidene-1'-phenyl-3'-methyl-5'-pyrazolone*

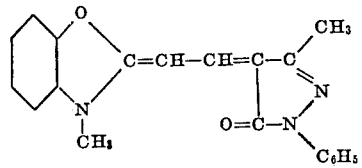

1.33 gms. of 2-methylbenzoxazole and 1.86 gms. of methyl-p-toluene sulphonate were mixed together and fused for three hours at 120° C. The mixture was dissolved in 20 ccs. of hot ethyl alcohol and there was then added 2 ccs. of triethylamine, 1.74 gms. of 1-phenyl-3-methyl-5-pyrazolone and 4 ccs. of ethylorthoformate. The resulting mixture was refluxed for four hours during which time a yellow colour developed. On cooling, the dyestuff crystallized out. The dyestuff was removed by filtration, and washed with ethyl-alcohol. The product consisted of small orange needles having a melting point of 183° C.

EXAMPLE X

*α-(3-ethyl-dihydrobenzthiazolylidene) - 2:4'-isobutylidene-1'-phenyl-3'-methyl-5'-pyrazolone*

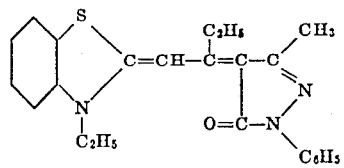

1.49 gms. of 2-methylbenzthiazole and 2 gms. of ethyl-p-toluene sulphonate were mixed together and heated for three hours at 140° C. The mixture was cooled and warmed with 25 ccs. of ethyl alcohol.

There was then added 2 ccs. of diethylamine, 4 ccs. of ethylorthopropionate and 1.74 gms. of 1-phenyl-3-methyl-5-pyrazolone. The resulting mixture was boiled for two hours under reflux and on cooling the dyestuff crystallized out. The dyestuff was filtered and washed with ethyl alcohol and ether. It consisted of orange-scarlet crystals having a melting point of 100° C.

The dyestuff is a sensitizer for photographic silver halide emulsions and extends the sensitivity of silver bromide emulsions to about 5800 Å. with a maximum of 5200 Å.

EXAMPLE XI

*1:3:3-trimethyl-indolylidene-2:4'-ethylidene-1'-β-naphthyl-3'-methyl-5'-pyrazolone*

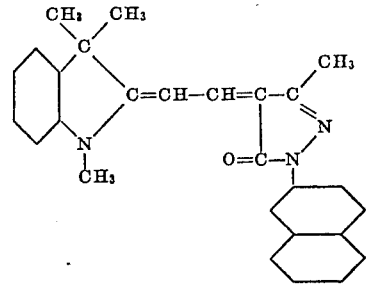

3.01 gms. of 2.3.3-trimethylindolenine methiodide were dissolved in 25 ccs. of ethyl alcohol and warmed on a water bath. There was then added 1.8 ccs. of diethylamine and the mixture was warmed until all the solid had dissolved. There was then added 2.24 gms. of β-naphthyl-3-methyl-5-pyrazolone and 6 ccs. of ethyl orthoformate. The mixture was gently refluxed for four hours and then cooled in a freezing mixture whereupon the product crystallized out. The crystalline product was separated by filtration, washed with ethyl alcohol and ether and then boiled out with methyl alcohol. It consisted of small crimson needles having a melting point of 245° C.

The dyestuff is a sensitizer for photographic silver halide emulsions and extends the sensitivity of silver bromide emulsions to about 5700 Å. with a maximum of 5350 Å.

Example XII

1:3:3-trimethyl-indolylidene-2:4'-ethylidene-1'-phenyl-3'-furyl-5'-pyrazolone

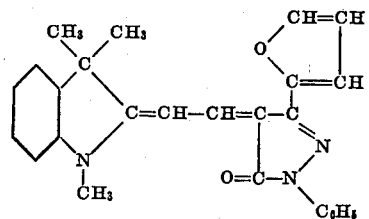

3.01 gms. of 2.3.3-trimethyl indolenine methiodide were warmed on a water bath with 25 ccs. of ethyl alcohol and 2 ccs. of diethylamine were added. When solution was completed there was added 2.28 gms. of 1-phenyl-3-furyl-5-pyrazolone and 6 ccs. of ethyl ortho formate. The mixture was gently refluxed for four hours, during which period an orange colour developed. On cooling in ice and diluting slightly, an oil was precipitated which was separated and dissolved in ethyl alcohol. The dyestuff crystallised out from this solution and was separated by filtration and washed with aqueous ethyl alcohol and ether. The product was obtained as small crimson needles having a melting point of 180° C.

Example XIII

1:3:3-trimethyl-indolylidene-2:4'-ethylidene-1'-β-naphthyl-3'-furyl-5'-pyrazolone

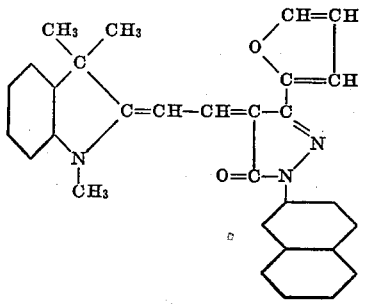

3.01 gms. of 2.3.3-trimethyl indolenine methiodide were warmed on a water bath with 25 ccs. of ethyl alcohol and 2 ccs. of diethylamine were added. When the solution was completed there was added 2.76 gms. of 1-naphthyl-3-furyl-5-pyrazolone and 6 ccs. of ethyl orthoformate. The mixture was gently refluxed for four hours during which period an orange colour developed. On cooling and dilution with water, an oil precipitated out. Ethyl alcohol was then added and the mixture warmed on a water bath. On cooling in a freezing mixture, the dyestuff crystallised out and was separated by filtration and washed with aqueous ethyl alcohol and ether. The product was obtained as crimson crystals having a melting point of 212° C.

Example XIV

1:3:3-trimethyl-indolylidene-2:4'-isopropylidene-1'-phenyl-3'-methyl-5'-pyrazolone

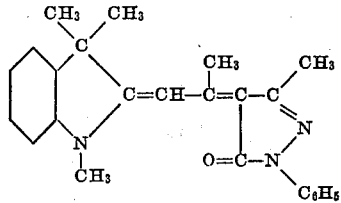

3.01 gms. of 2.3.3-trimethylindolenine methiodide, 10 ccs. of ethyl alcohol, 2 ccs. of diethylamine, 6 ccs. of ethyl ortho acetate and 1.74 gms. of 1-phenyl-3-methyl-5-pyrazolone were mixed together in the above order and heated on a water bath for one and a quarter hours. The solution was then diluted slightly with water and the solvents evaporated. The oily impurities were then extracted with petroleum ether and the aqueous liquors were extracted with ether. The ether extract was washed with water, dried over potassium carbonate and evaporated down to dryness.

The residue was dissolved in ethyl alcohol and the solution was then slightly diluted with water whereupon the dyestuff crystallised out. The product was obtained as crystals having a melting point of 197° C.

Example XV 3-methyl-dihydrobenzthiazolylidene-2:5'-ethylidene-3'-ethylrhodanine

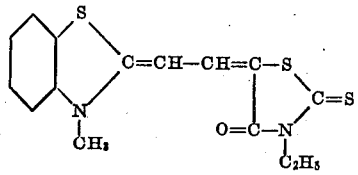

1.49 gms. of 2-methyl-benzthiazole and 1.86 gms. of methyl-p-toluene sulphonate were mixed together and heated at 120° C. for three hours. The mixture was then cooled and warmed with 20 ccs. of ethyl alcohol. There was then added 2 ccs. of triethylamine, 1.7 gms. of N-ethyl rhodanic acid and 4 ccs. of ethyl orthoformate. The resulting mixture was refluxed for four hours, during which period a reddish-blue colour developed and the dyestuff separated from solution. The separated dyestuff was removed by filtration and washed with ethyl alcohol. On boiling out with ethyl alcohol, the dyestuff was obtained as grey-green crystals having a melting point of 275° C.

The dyestuff is a sensitizer for photographic silver halide emulsions and extends the sensitivity of silver bromide emulsions to about 6300 Å with a maximum of 5800 Å.

Example XVI 3-methyl-dihydrobenzthiazolylidene-2:5'-ethylidene-3'-methyl-2'-thio-4'-keto-tetrahydrooxazole

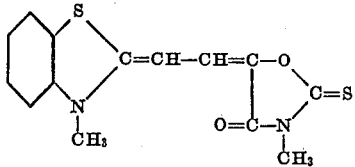

1.49 gms. of 2-methylbenzthiazole and 1.86 gms. of methyl-p-toluene sulphonate were mixed together and heated for three hours at 120° C. The resulting mixture was dissolved in 20 ccs. of hot ethyl alcohol and there was then added 2 ccs. of triethylamine, 1.31 gms. of N-methyl oxarhodanic acid and 4 ccs. of ethyl orthoformate. The resulting mixture was refluxed for six hours during which period an orange colour slowly developed. The mixture was then cooled whereupon the product crystallised out. The crystalline product was filtered off, washed with ethyl alcohol and boiled out with methyl alcohol. It consisted of a purple powder having a melting point of 287° C.

The dyestuff is a sensitizer for photographic silver halide emulsions and extends the sensitivity of silver chloride emulsions to about 5750 A with a maximum of 5600 A.

EXAMPLE XVII 3-methyl-dihydrobenzthiazolylidene-2:5'-isopropylidene-3'-ethyl rhodanine

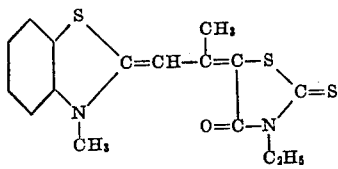

1.49 gms. of 2-methylbenzthiazole and 1.86 gms. of methyl-p-toluene sulphonate were heated together at 120° C. for 3½ hours. The mixture was then cooled and dissolved in 25 ccs. of hot ethyl alcohol. There was then added 2 ccs. of triethylamine, 1.7 gms. of N-ethyl rhodanic acid and 4 ccs. of ethyl orthoacetate. The mixture was then refluxed for four hours during which a red colour developed and the dyestuff separated from solution. On boiling out the dyestuff with ethyl alcohol the product was obtained as a purple powder having a melting point of 217° C.

EXAMPLE XVIII 3-methyl-dihydrobenzoxazolylidene-2:4'-isopropylidene 1'-phenyl-3'-methyl-5'-pyrazolone

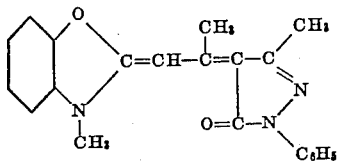

1.33 gms. of 2-methylbenzoxazole and 1.86 gms. of methyl-p-toluene sulphonate were heated at 120° C. for three hours. The mixture was then cooled and dissolved in 20 ccs. of hot ethyl alcohol. There was then added 2 ccs. of diethylamine, 1.74 gms. of 1-phenyl-3-methyl-5-pyrazolone and 4 ccs. of ethyl orthoacetate. The resulting mixture was refluxed for three hours during which a yellow colour developed. On cooling, the dyestuff crystallised out and was separated by filtration and washed with alcohol and ether. The product was obtained as yellow needles having a melting point of 180° C.

The dyestuff is a sensitizer for photographic silver halide emulsions and extends the sensitivity of silver chloride emulsion to about 5200 A with maxima at 4800 A and 4400 A.

EXAMPLE XIX 3-ethyl-dihydrobenzselenazolylidene-2:4'-ethylidene-1'-phenyl-3'-methyl-5-pyrazolone

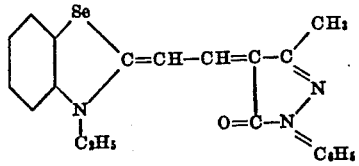

1.96 gms. of 2-methylbenzselenazole and 2 gms. of ethyl-p-toluene sulphonate were mixed together and heated for four hours at 140–150° C. The mixture was then cooled and dissolved in 20 ccs. of hot ethyl alcohol. There was then added 2 ccs. of diethylamine, 1.74 gms. of 1-phenyl-3-methyl-5-pyrazolone and 4 ccs. of ethyl orthoformate. The resulting mixture was refluxed for four hours during which period an orange colour developed. The mixture was then poured into a beaker, diluted slightly with water and allowed to stand whereupon the dyestuff crystallised out. The dyestuff was separated by filtration and washed with ethyl alcohol and ether. The product was obtained as orange needles having a melting point of 222° C.

EXAMPLE XX 3-ethyl-dihydrobenzoxazolylidene-2:4'-ethylidene-1'-phenyl-3'-methyl-5'-pyrazolone

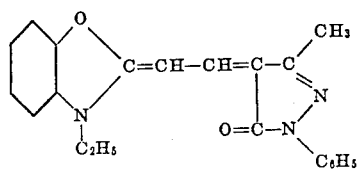

1.33 gms. of 2-methylbenzoxazole and 2 gms. of ethyl-p-toluene sulphonate were mixed together and heated for three hours at 130° C. The mixture was then warmed with 20 ccs. of ethyl alcohol and there was then added 2 ccs. of triethylamine, 1.74 gms. of 1-phenyl-3-methyl-5-pyrazolone and 4 ccs. of ethyl orthoformate. The resulting mixture was refluxed for four hours and on cooling the dyestuff crystallised out. The dyestuff was separated by filtration and washed with ethyl alcohol and ether. The product was obtained as long yellow needles having a melting point of 179° C.

EXAMPLE XXI 1-methyl-dihydroquenolylidene-4:4'-ethylidene-1'-phenyl-3'-methyl-5'-pyrazolone

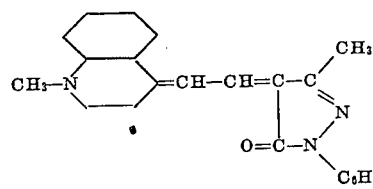

1.4 gms. of lepidine methiodide, 0.87 gms. of 1-phenyl-3-methyl-5-pyrazolone and 10 ccs. of ethyl alcohol were mixed together and heated on a water bath. There was then added 2 ccs. of ethyl orthoformate and 1 cc. of diethylamine. The mixture was then refluxed for 4½ hours. On cooling, the mixture was diluted with water, the aqueous layer decanted and the residual oil lixiviated with hot ethyl alcohol. The product was cooled, filtered and washed with ethyl alcohol and ether. The product was obtained as bright olive green needles having a melting point of 251° C.

EXAMPLE XXII

α-(1:3:3-trimethyl-indolylidene)-2:4'-sobutyl-idene-1'-phenyl-3'-methyl-5'-pyrazolone

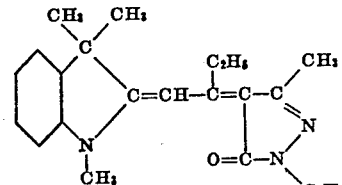

3.01 gms. of 2.3.3-trimethylindoleninemethiodide were warmed with 20 ccs. of ethyl alcohol. There was then added 1.8 ccs. of diethylamine, 1.74 gms. of 1-phenyl-3-methyl-5-pyrazolone and 4 ccs. of ethyl orthopropionate. The resulting mixture was gently refluxed for four hours during which orange colour developed. The mixture was then cooled, and a portion was evaporated to low bulk and stirred with ethyl alcohol. The dyestuff crystallised out. This dyestuff was then added to the main bulk of solution and on cooling in a freezing mixture the dyestuff crystallised out in bulk. The dyestuff was separated by filtration and washed with ethyl alcohol and ether. It consisted of orange crystals having a melting point of 209° C.

EXAMPLE XXIII

*3-methyl-dihydrobenzoxazolylidene-2:5'-ethylidene-thiohydantoin*

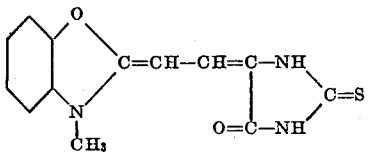

1.33 gms. of 2-methylbenzoxazole and 1.86 gms. of methyl-p-toluene sulphonate were mixed together and heated at 140° C. for three hours. The mixture was then cooled and dissolved in 20 ccs. of ethyl alcohol. There was then added 2 ccs. of triethylamine, 1.16 gms. of thiohydantoin and 4 ccs. of ethyl orthoformate. The mixture was then gently refluxed for four hours during which a yellow colour developed. On cooling, the dyestuff crystallised out, was separated by filtration and washed with ethyl alcohol and ether. The product was obtained as pale brown crystals having a melting point of 245° C. at which temperature the dyestuff decomposed.

EXAMPLE XXIV

*α-(3-ethyl-dihydrobenzthiazolylidene)-2:5'-isobutylidene-3'-ethyl rhodanine*

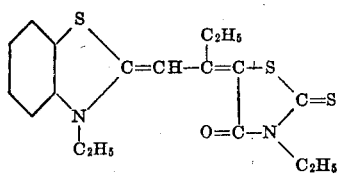

1.49 gms. of 2-methylbenzthiazole and 2 gms. of ethyl-p-toluene sulphonate were mixed and heated for three hours at 140° C. The mixture was then cooled and dissolved in 20 ccs. of hot ethyl alcohol. There was then added 2 ccs. of diethylamine, 1.7 gms. of N-ethyl rhodanic acid and 4 ccs. of ethyl orthopropionate. The mixture was gently refluxed for four hours during which period a reddish-purple colour developed. On cooling and diluting with water an oil was precipitated. The aqueous layer was decanted and the residual oil heated with ethyl alcohol and benzene. On cooling the solution, the dyestuff crystallized out. The dyestuff was obtained as crystals having a melting point of 146° C.

EXAMPLE XXV

*3-methyl-dihydrobenzthiazolylidene-2:5'-ethylidene-thiohydantoin*

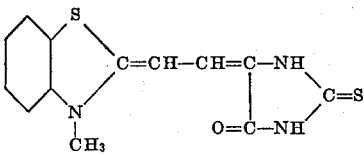

1.49 gms. of 2-methylbenzthiazole and 1.86 gms. of methyl-p-toluene sulphonate were heated together at 130–140° C. for 1½ hours. The resulting mixture was warmed with 25 ccs. of ethyl alcohol and there was then added 2.2 ccs. of triethylamine, 1.16 gms. of thiohydantoin and 6 ccs. of ethyl orthoformate. The mixture was then gently refluxed for four hours during which an orange colour developed. The cooled mixture was then diluted with water and the precipitated dyestuff removed by filtration and washed with ethyl alcohol and ether. It consisted of deep purple crystals having melting point of 275° C.

The dyestuff is a sensitizer for photographic silver halide emulsions and extends the sensitivity of silver bromide emulsions to about 5900A with a maximum at 5600A.

EXAMPLE XXVI

*3-methyl-dihydrobenzthiazolylidene-2:3'-ethylidene-1'-ethyloxindole*

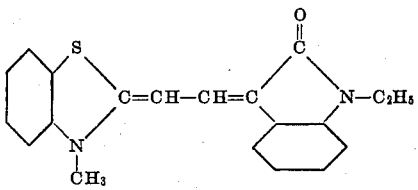

1.49 gms. of 2-methylbenzthiazole and 1.86 gms. of methyl-p-toluene sulphonate were mixed together and heated for 1½ hours at 140° C. The mixture was then cooled and dissolved in 25 ccs. of ethyl alcohol. There was then added 2.2 ccs. of triethylamine, 1.65 gms. of N-ethyl oxindole and 6 ccs. of ethyl orthoformate. The resulting mixture was boiled for four hours during which an orange colour developed. The mixture was then cooled and diluted with water. The dyestuff precipitated was removed by filtration and washed with ethyl alcohol and ether. The product was obtained as red crystals with a green reflex having a melting point of 217° C.

The dyestuff is a sensitizer for photographic silver halide emulsions and extends the sensitivity of silver chloride emulsions to about 5800A with a maximum at 5300A.

EXAMPLE XXVII

*3-methyl-dihydrobenzoxazolylidene - 2:3'-ethylidene-1-ethyloxindole*

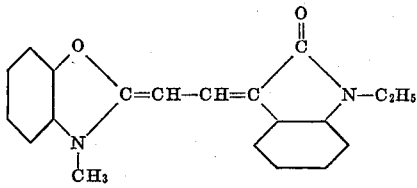

1.33 gms. of 2-methylbenzoxazole and 1.86 gms. of methyl-p-toluene sulphonate were mixed and heated for two hours at 120° C. The mixture was then cooled and warmed with 10 ccs. of ethyl alcohol. There was then added 1.6 ccs. of triethylamine, 1.61 gms. of N-ethyloxindole and 6 ccs. of ethyl orthoformate. The mixture was then heated on a water bath for three hours during which a deep orange colour developed. The mixture was then cooled and diluted with water.

The precipitated dyestuff was removed by filtration and washed with ethyl alcohol and ether. The product was obtained as orange plates having a melting point of 202° C.

The dyestuff is a sensitizer for photographic silver halide emulsions and extends the sensitivity of silver chloride emulsions to about 5400 A. with a maximum at 5000 A.

EXAMPLE XXVIII 3-methyl-dihydrobenzthiazolylidene-2:3'-ethylidene-1-methyloxindole

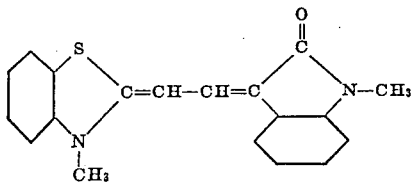

1.49 gms. of 2-methylbenzthiazole and 1.86 gms. of methyl-p-toluene sulphonate were mixed together and heated for 3½ hours at 120° C. The resulting mixture was warmed with 25 ccs. of ethyl alcohol and there was then added 1.47 gms. of N-methyl-oxindole, 6 ccs. of ethyl orthoformate and 2.2 ccs. of triethylamine. The resulting mixture was heated on a water bath for six hours during which period the orange colour slowly developed. On cooling, the dyestuff crystallised out and was separated by filtration and washed with ethyl alcohol and ether. The product, after boiling out with methyl alcohol, was obtained as red needles with a green reflex having a melting point of 273° C.

The dyestuff is a sensitizer for photographic silver halide emulsions and extends the sensitivity of silver chloride emulsions to about 5800 A. with a maximum at 5300 A.

EXAMPLE XXIX 1-phenyl-3-methyl-5-pyrazolonylidene-4.2'-isopropylidene-3'-methyl-dihydrobenzthiazole

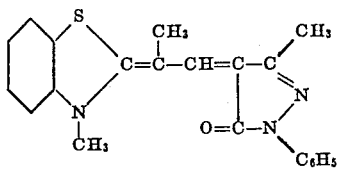

1.63 gms. of 2-ethyl benzthiazole and 1.86 gms. of methyl-p-toluene sulphonate were mixed together and heated for three hours at 140° C. The mixture was then cooled and dissolved in 20 ccs. of hot ethyl alcohol. There was then added 1.6 ccs. of diethylamine, 1.74 gms. of 1-phenyl-3-methyl-5-pyrazolone and 4 ccs. of ethyl orthoformate. The mixture was then refluxed on a water bath for three hours during which an orange yellow colour developed. The mixture was then cooled, whereupon the dyestuff crystallised out. The crystalline dyestuff was removed by filtration and washed with ethyl alcohol and ether. It had a melting point of 181° C.

EXAMPLE XXX 2-thio-3-ethyl-4-keto-tetrahydrothiazolylidene-5.2'-isopropylidene-3'-methyldihydrobenzthiazole

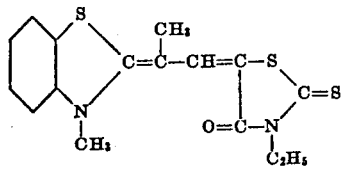

1.63 gms. of 2-ethylbenzthiazole and 1.86 gms. of methyl-p-toluene sulphonate were mixed together and heated for three hours at 140° C. The mixture was then cooled and dissolved in 25 ccs. of hot ethyl alcohol.

There was then added 2 ccs. of triethylamine, 1.7 gms. of N-ethyl rhodanic acid and 4 ccs. of ethyl orthoformate. The mixture was then heated on a water bath under reflux for three hours, during which a reddish-blue colour developed. The mixture was then cooled whereupon the dyestuff crystallised out. The dyestuff was separated by filtration and washed with ethyl alcohol and ether. It had a melting point of 241° C.

The corresponding compound in which both the central carbon atoms contain methyl substituent groups may be obtained in a similar manner by using ethyl orthoacetate instead of ethyl orthoformate.

The process of this invention presents a number of very considerable advantages. It is remarkably simple in character and avoids the multiplicity of steps which have been necessary in previous methods which have been suggested. The compounds are formed by simply heating the reactants together and in most cases no recrystallisation of the product is necessary because it separates from the reaction mixture in a condition of substantial purity. Moreover, the reaction can be effected in solution in ethyl alcohol, which is a very cheap solvent compared with the pyridine which was found to be necessary in other methods.

I claim:

1. A process for the production of unsymmetrical dyestuffs which comprises reacting together in the presence of a basic substance having an ionization constant of at least as great as that of ammonia a heterocyclic nitrogen compound of the type used in the production of cyanine dyes containing in one of the α or γ positions to the heterocyclic nitrogen atom an external substituent reactive group selected from the class consisting of methyl, methylene, mono-substituted methyl and mono-substituted methylene groups, an ortho ester of a mono-carboxylic acid and a five-membered heterocyclic nitrogen compound containing the grouping —NR₁—CO—CH₂— in the heterocyclic ring where R₁ is selected from the class consisting of hydrogen atoms and hydrocarbon groups.

2. A process for the production of unsymmetrical dyestuffs which comprises reacting together in the presence of a basic substance having an ionization constant at least as great as that of ammonia a heterocyclic nitrogen compound of the type used in the production of cyanine dyes containing in one of the α and λ positions to the heterocyclic nitrogen atom an external substituent reactive group selected from the class consisting of methyl, methylene, mono-substituted methyl and mono-substituted methylene groups, an ortho ester of a mono-carboxylic acid and a compound containing a rhodanine nucleus in which the —CH₂— group is unsubstituted.

3. A process for the production of unsymmetrical dyestuffs which comprises reacting together in the presence of a basic substance having an ionization constant at least as great as that of ammonia a heterocyclic nitrogen compound of the type used in the production of cyanine dyes containing in one of the α and γ positions to the heterocyclic nitrogen atom an external substituent reactive group selected from the class consisting of methyl, methylene, mono-substituted methyl and mono-substituted methylene groups, an ortho ester of a monocarboxylic acid and a compound containing a pyrazolone nucleus in which the —CH₂— group is unsubstituted.

4. A process for the production of unsymmetrical dyestuffs which comprises reacting together in the presence of a basic substance having an ionization constant at least as great as that of ammonia a heterocyclic nitrogen compound containing a five-membered azole nucleus and containing in the α position to the nitrogen atom of said azole nucleus an external substituent reactive group selected from the class consisting of methyl, methylene, mono-substituted methyl and mono-substituted methylene groups, an ortho ester of a mono carboxylic acid and a five-membered heterocyclic nitrogen compound containing the grouping —NR₁—CO—CH₂— in the heterocyclic ring where R₁ is selected from the class consisting of hydrogen atoms and hydrocarbon groups.

5. A process for the production of unsymmetrical dyestuffs which comprises reacting together in the presence of a basic substance having an ionization constant at least as great as that of ammonia a quaternary salt of a heterocyclic nitrogen compound of the type used in the production of cyanine dyes containing in one of the α or γ positions to the heterocyclic nitrogen atom a methyl group, an ortho ester of a mono-carboxylic acid and a five-membered heterocyclic nitrogen compound containing the grouping —NR₁—CO—CH₂— in the heterocyclic ring where R₁ is selected from the class consisting of hydrogen atoms and hydrocarbon groups.

6. A process for the production of unsymmetrical dyestuffs which comprises reacting together in the presence of a basic substance having an ionization constant at least as great as that of ammonia a heterocyclic nitrogen compound containing a five-membered azole nucleus and containing in the α position to the nitrogen atom of said azole nucleus an external substituent reactive group selected from the class consisting of methyl, methylene, mono-substituted methyl and mono-substituted methylene groups, an ortho ester of a monocarboxylic acid and a compound containing a rhodanine nucleus in which the —CH₂— group is unsubstituted.

7. A process for the production of unsymmetrical dyestuffs which comprises reacting together in the presence of a basic substance having an ionization constant at least as great as that of ammonia a heterocyclic nitrogen compound containing a five-membered azole nucleus and containing in the α position to the nitrogen atom of said azole nucleus an external substituent reactive group selected from the class consisting of methyl, methylene, mono-substituted methyl and mono-substituted methylene groups, an ortho ester of a mono-carboxylic acid and a compound containing a pyrazolone nucleus in which the —CH₂— group is unsubstituted.

8. A process for the production of unsymmetrical dyestuffs which comprises reacting together in the presence of a basic substance having an ionization constant at least as great as that of ammonia a heterocyclic nitrogen compound containing an indolenine nucleus and containing in the α position to the nitrogen atom of said indolenine nucleus an external substituent reactive group selected from the class consisting of methyl, methylene, mono-substituted methyl and mono-substituted methylene groups, an ortho ester of a mono-carboxylic acid and a compound containing a pyrazolone nucleus in which the —CH₂— group is unsubstituted.

9. A process as set forth in claim 1 wherein said first mentioned heterocyclic nitrogen compound is an indolenine and said last mentioned compound is a pyrazolone.

10. A process for the production of unsymmetrical dyestuffs which comprises reacting together in the presence of a basic substance having an ionization constant at least as great as that of ammonia 1,3,3-trimethyl-indolenine methiodide, ethyl-ortho-formate and 1-phenyl-3-methyl-5-pyrazolone.

11. A process as set forth in claim 1 wherein the basic substance is sodium ethoxide.

12. A process as set forth in claim 1 wherein the basic substance is diethylamine.

13. A process as set forth in claim 1 wherein the basic substance is triethylamine.

JOHN DAVID KENDALL.

CERTIFICATE OF CORRECTION.

Patent No. 2,265,908.  December 9, 1941.

JOHN DAVID KENDALL.

It is hereby certified that error appears in the printed specification of the above numbered patent requiring correction as follows: Page 1, first column, line 54, for "$NR_1-CO-CH_2-$" read -- $-NR_1-CO-CH_2-$ --; and second column, line 18, for "pyrazolenes" read --pyrazolones--; page 2, first column, line 2, for "group" read --groups--; and second column, line 15, for "alkylimino" read --allylimino--; page 3, first column, line 74, for "produce" read --product--; and second column, line 73, in the formula, Example VII, for "$O=C=N$" read --$O=C-N$--; page 4, first column, line 27, for "pyrozolone" read --pyrazolone--; page 6, first column, line 66-67, in the formula, Example XIX, for $\overset{"N}{\diagdown}_{C_6H_5}"$ read --$\overset{N}{\diagdown}_{C_6H_5}$--; and second column, line 35, for "dihydroquenolylidene" read --dihydroquinolylidene--; and line 60, for "sobutyl" read --isobutyl--; page 8, second column, line 35, claim 1, strike out "of"; and that the said Letters Patent should be read with this correction therein that the same may conform to the record of the case in the Patent Office.

Signed and sealed this 10th day of February, A. D. 1942.

Henry Van Arsdale,
Acting Commissioner of Patents.

(Seal)